(12) United States Patent
Smith et al.

(10) Patent No.: US 12,153,634 B1
(45) Date of Patent: Nov. 26, 2024

(54) APPARATUS AND METHOD FOR OPTIMAL ZONE STRATEGY SELECTION

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/600,872

(22) Filed: Mar. 11, 2024

(51) Int. Cl.
*G06F 16/9035* (2019.01)
*G06F 16/906* (2019.01)
*G06F 16/951* (2019.01)

(52) U.S. Cl.
CPC ........ *G06F 16/9035* (2019.01); *G06F 16/906* (2019.01); *G06F 16/951* (2019.01)

(58) Field of Classification Search
CPC ... G06F 16/9035; G06F 16/906; G06F 16/951
USPC ........................................................ 707/709
See application file for complete search history.

(56) References Cited

U.S. PATENT DOCUMENTS

| | | | |
|---|---|---|---|
| 11,599,592 B1 | 3/2023 | Adams | |
| 11,756,663 B2 | 9/2023 | Neumann | |
| 2009/0292588 A1* | 11/2009 | Duzevik | G06N 3/126 |
| | | | 705/7.29 |
| 2014/0358828 A1 | 12/2014 | Phillipps | |
| 2016/0321935 A1 | 11/2016 | Mohler | |
| 2016/0365006 A1* | 12/2016 | Minturn | G16H 15/00 |
| 2019/0009133 A1* | 1/2019 | Mettler May | G09B 19/0038 |
| 2022/0027743 A1* | 1/2022 | Adriaenssen | G06N 3/006 |
| 2022/0027783 A1* | 1/2022 | Neumann | G16H 10/60 |
| 2022/0284500 A1* | 9/2022 | Sanghavi | G06N 5/04 |

OTHER PUBLICATIONS

Lee, Jong Ho, et al., "Understanding and Supporting Self-tracking App Selection", Proc. of the ACM on Interactive, Mobile, Wearable and Ubiquitous Technologies, vol. 5, Issue 4, Article No. 166, Dec. 30, 2021, pp. 1-25.*
Caldeira, Clara, et al., "Mobile apps for mood tracking: an analysis of features and user reviews", AMIA Annu Symp Proc, 2017, PMCID: PMC5977660, pp. 495-504.*
Hollis, Victoria, et al., "Change of Heart: Emotion Tracking to Promote Behavior Change", CHI 2015, Seoul, Republic of Korea, Apr. 18-23, 2015, pp. 2643-2652.*

(Continued)

*Primary Examiner* — Robert Stevens
(74) *Attorney, Agent, or Firm* — Caldwell Intellectual Property Law

(57) ABSTRACT

An apparatus and method for optimal zone strategy selection. The apparatus includes a processor configured to receive user data, generate a user goal using a target machine-learning model, generate zone strategies based on the user goal, generate a plurality of zone strategy scores a function of the zone strategies, determine follow through data as a function of the plurality of zone strategy scores and the zone strategies, populate a user interface data structure, wherein the user interface data structure includes a visual representation of the zone strategies and the follow-through data, and transmit the user interface data structure to a display device communicatively connected to the processor.

20 Claims, 8 Drawing Sheets

(56) References Cited

OTHER PUBLICATIONS

Chatterjee, Ayan, et al., "ProHealth eCoach: user-centered design and development of an eCoach app to promote healthy lifestyle with personalized activity recommendations", BMC Health Services Research, vol. 22, article No. 1120, Sep. 4, 2022, pp. 1-26.*

* cited by examiner

APPARATUS AND METHOD FOR OPTIMAL ZONE STRATEGY SELECTION

FIELD OF THE INVENTION

The present invention generally relates to the field of artificial intelligence. In particular, the present invention is directed to an apparatus and method for optimal zone strategy selection.

BACKGROUND

Existing systems and apparatus designed for zone strategy selection face challenges in effectively accounting for and processing the vast and ambiguously defined data they receive. This limitation hinders their ability to provide accurate and personalized zone strategy selections tailored to individual users. The inadequacy of current approaches in handling large and complex datasets often leads to undesirable outcomes and potential inaccuracies in zone strategy selection. Such shortcomings can have significant short-term and long-term consequences, impacting the overall effectiveness and user satisfaction of the system. To address these issues, there is a critical need to integrate optimization techniques that leverage user-specific data, allowing for a more refined and adaptive zone strategy selection process.

SUMMARY OF THE DISCLOSURE

In an aspect, an apparatus for optimal zone strategy selection. The apparatus includes at least a processor, a memory communicatively connected to the processor, the memory containing instructions configuring the processor to receive user data, generate a user goal using a target machine-learning model configured to classify a plurality of user datum to a plurality of target classes, generate zone strategies based on the user goal using a zone strategy machine learning model, generate a plurality of zone strategy scores a function of the zone strategies using an optimization algorithm configured to rank the zone strategies by an objective function based on minimizing at least psychological stress, wherein at least one zone strategy score of the plurality of zone strategy scores is associated to at least one individual zone strategy of the zone strategies, determine follow through data as a function of the plurality of zone strategy scores and the zone strategies, populate a user interface data structure, wherein the user interface data structure includes the zone strategies and the follow through data, transmit the user interface data structure to a display device communicatively connected to the at least a processor.

In another aspect, a method for optimal zone strategy selection. The method includes using a processor configured to receive user data, generate a user goal using a target machine-learning model configured to classify a plurality of user datum to a plurality of target classes, generate zone strategies based on the user goal using a zone strategy machine learning model, generate a plurality of zone strategy scores a function of the zone strategies using an optimization algorithm configured to rank the zone strategies by an objective function based on minimizing at least psychological stress, wherein at least one zone strategy score of the plurality of zone strategy scores is associated to at least one individual zone strategy of the zone strategies, determine follow through data as a function of the plurality of zone strategy scores and the zone strategies, populate a user interface data structure, wherein the user interface data structure includes the zone strategies and the follow through data, transmit the user interface data structure to a display device communicatively connected to the at least a processor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for optimal zone strategy selection. In an embodiment, methods may include utilizing machine learning to generate follow through data containing instructions on improving a particular zone strategy.

By incorporating user data into the optimization framework, the system can enhance its decision-making capabilities, leading to more precise and context-aware zone strategy selections. This approach aims to mitigate the challenges associated with poorly defined data and, ultimately, improve the accuracy and relevance of zone strategy selections, thereby optimizing user experience and minimizing adverse impacts on both short-term and long-term system performance. Exemplary embodiments illustrating aspects of the present disclosure are described below in the context of several specific examples.

Figure 1:
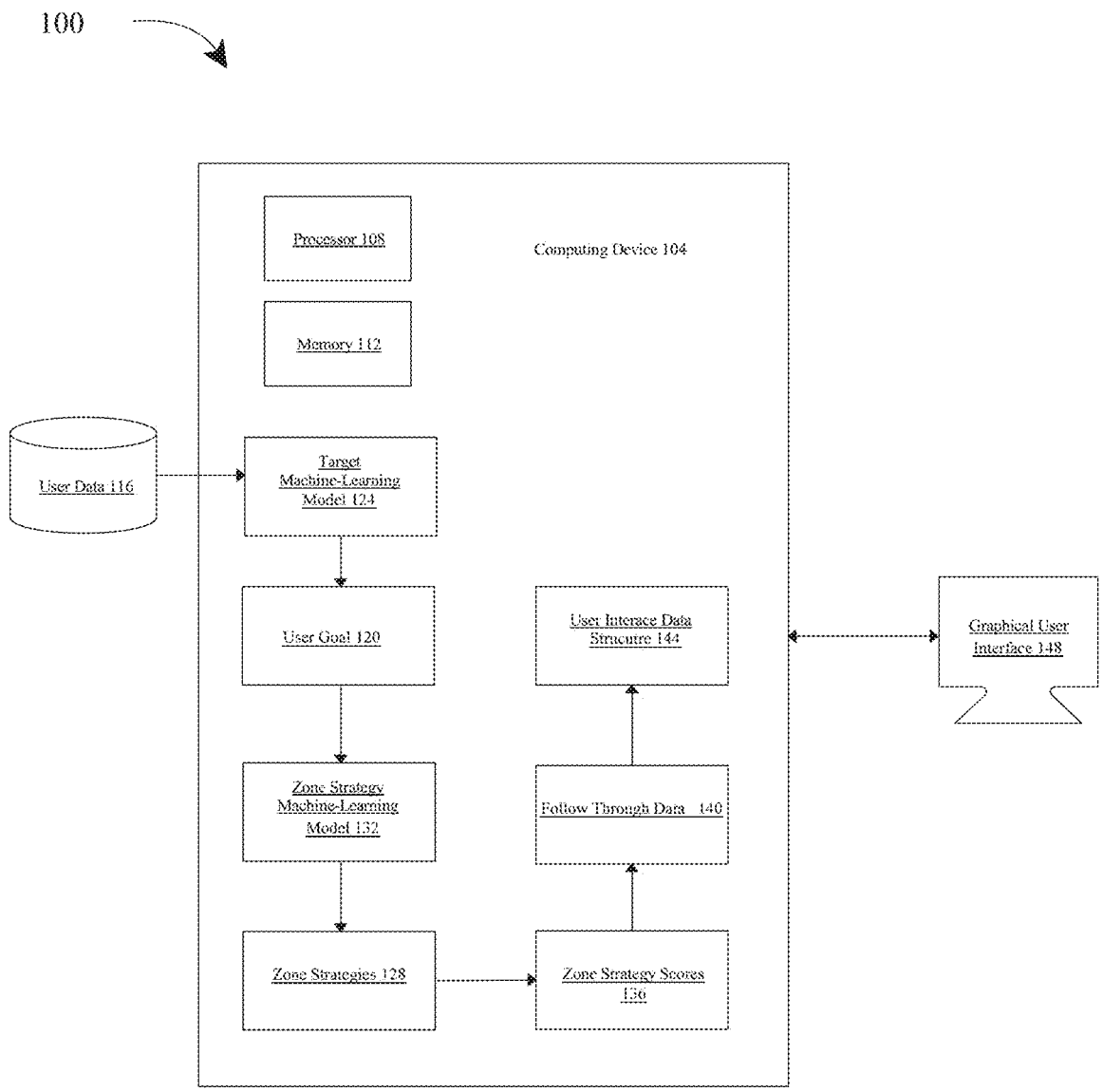
FIG. 1 is a block diagram of an exemplary embodiment of an apparatus for zone strategy selection.

Referring now to FIG. 1, an exemplary embodiment of an apparatus 100 for zone strategy selection is illustrated. Apparatus 100 includes a computing device. Apparatus 100 includes a processor. Processor 108 may include, without limitation, any processor 108 described in this disclosure. Processor 108 may be included in a computing device. Computing device 104 may include any computing device 104 as described in this disclosure, including without limitation a microcontroller, microprocessor, digital signal Processor (DSP) and/or system on a chip (SoC) as described in this disclosure. Computing device 104 may include, be included in, and/or communicate with a mobile device such as a mobile telephone or smartphone. Computing device 104 may include a single computing device operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor 108 module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 is configured to receive user data 116. As used in this disclosure, "user data" is data associated with a user of interest. In some embodiments, user data 116 may include any data associated with a specific user. User data 116 may include, for example, a user personal attributes, dreams, wants, desires, goals, and the like. User data may include a user's confidence levels, a user's data describing a user's schedule, a user's work or personal calendar, a user's commitments, a user's job role or title, clubs or associations that a user belongs to, family connections and related commitments (such as childcare, elder care, pets, etc.) and the like.

With continued reference to FIG. 1, user data 116 may include any data relating a user's confidence levels in relation to self-perception (such as self-image, self-esteem, and the like). This may include any indication that may determine a user's confidence and/or a lack thereof. For example, user data 116 may include a user's stamina with regards to a particular activity wherein the user's stamina may be used to determine a user's confidence. Continuing, a low stamina may indicate low confidence or a lack thereof in a particular activity. "Confidence" as described in this disclosure is a feeling of self-assurance arising from one's appreciation of one's own abilities. Low confidence may indicate that a user has a low appreciation of their own abilities or a lack of self-assurance as a result of one's abilities. User data 116 may include data relating to a user's confidence levels in social interactions (e.g. failure to make eye contact, stuttering while speaking, nervousness during a public speech, failure to maintain proper body posture, avoiding social situations altogether, manifesting physical signs of stress or anxiety during a social interaction, and the like). User data 116 may further include data relating to a user's confidence in work related situations (e.g. avoidance of complex tasks, failure to be assertive or lacking assertiveness, fear of taking on new projects, fear of taking on new responsibilities, failure to complete tasks, failure to start tasks, avoidance of difficult work, lacking confidence to peak to an employer or an employee, and the like). User data 116 may further include data relating to a user's confidence in relation to self-image (e.g. body image issues, lack of confidence in knowledge of a particular field, poor stress management, lack of self-growth, and the like. User data 116 may further include any data that may indicate a lack of confidence in any particular field. This includes but is not limited to, poor work product, failure to engage in social interactions, failure to take responsibility, poor negotiating skills, poor management skills and the like. Additionally, or alternatively, user data 116 may include data relating a user's abilities. Data relating to a user's abilities may be used to increase a user's confidence by increasing a user's experience in a specific ability. Data relating to a user's abilities may include a user's ability to interact with one another, a user's ability to write or communicate effectively, a user's knowledge or ability to perform functions in a particular field such as math, science, finance, and the like.

With continued reference to FIG. 1, user data 116 may include basic information, such as and without limitations, age, gender, marital and/or family status, previous work history, previous education history, and the like. In some embodiments, user data 116 may be received through an input device. In some instances, input device may be apparatus 100. In some instances, input device may include a remote device. In instances where user data 116 is input into a remote input device, remote device may transmit user data 116 across a wireless connection. In some embodiments, wireless connection may be any suitable connection (e. g., radio, cellular). In some instances, input device may include a user device such as, without limitation, computer, laptop, smart phone, tablet, or things of the like. In some instances, user data 116 may be stored in a data store and associated with a user account. It should be noted that data store may be accessed by any input device, using authorization credentials associated with user data 116. In some instances, user data 116 may be created and stored via a laptop and accessed from tablet, using authorization credentials.

With continued reference to FIG. 1, user data 116 may further include assessment data wherein assessment data includes physiological traits of a user. "Assessment data" as for the purposes of this disclosure is any data that may be used to evaluate a particular trait of a user. For example assessment data may include a user's spending habits, educational level, marital status and the like. "Physiological traits" for the purposes of this disclosure are biological traits relating to a human such as a user's height, weight, fitness, blood pressure, oxygen levels, age, body temperature and the like. Physiological traits may be received from an input device, such as computing device, or a device capable of measuring psychological traits such as a wrist-based heart monitor, a wrist-based oxygen monitor and the like. Wearable devices such as wrist-based heart monitors, wrist-based oxygen monitors, wearable EKG monitors and the like may be used to receive a plurality of physiological related data. This may include a user's heart rate over a given period of time, a user's sleep patterns, a user's oxygen levels and the like. Wearable devices may include remote devices that may communicate with computing system either over a wired or wireless connection. Wearable devices may include, as non-limiting examples, smartwatches, fitness trackers, smart glasses, smart gloves, and the like. In an embodiment, physiological data may be used to determine a user's confidence level by monitoring changes in the physiological data during an activity. For example, an increase in heart rate during a social interaction may indicate that a user is not comfortable or confident in the interaction.

With continued reference to FIG. 1, user data 116 may further include current data. "Current data" for the purposes of this disclosure is data relating to a user at the current moment or during the current iteration of a computing process. Current data may include any data that has not yet been entered yet. Current data may further include any data in which a user may seek to receive outputted results from computing device 104 as described further below. User data 116 may further include a plurality of previously entered user data. "Previously entered user data" as described in this disclosure is any user data 116 that corresponds to a time or iteration before current data. Previously entered user data may be user data 116 relating to a user of a previous iteration of computing device. Previously entered user data may further be any user data 116 received by computing device 104 on a previous event. In some cases, computing device 104 may input current data into previously entered user data at the completion of the computing process to be used for later on. In some cases, plurality of previously entered user data includes a plurality of current data taken from previous iterations. Previously entered user data may be retrieved from a storage associated with computing device 104 or a database as described in this disclosure. In some cases, previously entered user data may associated with a user account, wherein the user account is a label indicating that previously entered user data belongs or is associated with a specific user.

Still referring to FIG. 1, database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records.

With continued reference to FIG. 1, user data 116 includes at least a user goal 120. "User goal" for the purposes of this disclosure is an objective or a desired result that a user seeks to achieve. At least a user goal 120 may include a plurality of user goals. User goal 120 may include any objective set by a user. User goal 120 may pertain to wants a desire of a user such as wanting to buy a sport car, wanting to afford a fancy dress, wanting to retire by a certain age, wanting to travel the world, and the like. User goal 120 may include the objective of finishing tasks on time, improving self-confidence, improving confidence related to social interactions, improving the assertiveness of a user and the like. User goal 120 may further include any improvement of any attributes of a user as described in user data 116 above. This includes but it not limited to improvement of various physiological traits, improvement in finances, improvement in employment and the like.

With continued reference to FIG. 1, user data 116 may include data in the form of audio, text, images, audio-visual data, and the like. In some cases, user data 116 may include a user's search history from computing device 104, internet browser or website. In some cases, user data 116 may include financial documents, such as previous spending history, credit card transactions and the like. In some cases, user data 116 may include screenshots of conversations, actions or activities that were taken on a computing device. In some cases, user data 116 may include data captured from virtual environments. Virtual environment may include a plurality of devices connected through networks. In a non-limiting example, apparatus 100 may be configured to receive user data 116 from the internet. Such user data 116 may include data from social media posts, feeds, browsing histories, and the like thereof. Apparatus 100 may utilize a web crawler to collect user data 116 in the virtual environment. Apparatus 100 may be configured to extract an action pattern, wherein the action pattern refers to a set of behaviors or actions taken by a user when interacting with apparatus 100.

Still referring to FIG. 1, a "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to scrape user data 116 from a plurality social media sites, blogs, or forums associated with the user. In some embodiments, the web crawler may be trained with information received from the user input through a user interface as described further below. In some embodiments, the web crawler may be configured to generate a web query. A web query may include search criteria received from a user. For example, a user may submit a plurality of websites for the web crawler to search to user data statistics from and correlate to pecuniary user data, educational user data, social user data, and the like. Additionally, the web crawler function may be configured to search for and/or detect one or more data patterns. A "data pattern" as used in this disclosure is any repeating forms of information. A data pattern may include repeating pecuniary datum, educational datum, and the like. In some embodiments, the web crawler may be configured to determine the relevancy of a data pattern. Relevancy may be determined by a relevancy score. A relevancy score may be automatically generated by processor 108, received from a machine learning model, and/or received from the user. In some embodiments, a relevancy score may include a range of numerical values that may correspond to a relevancy strength of data received from a web crawler function.

With continued reference to FIG. 1, receiving user data 116 may further include processing user data 116. "Processing" for the purposes of this disclosure refers to the conversion, maintenance, or modification of data such that the data may be properly used by a computing device. For example, processing user data 116 may include compression by inter-frame coding as described in this disclosure. Processing user data 116 may further include converting user data 116 into text-based data. Computing device 104 may use "speech to text" or "Automatic speech recognition" in order to convert audio data inputted by a user into text data that may be used later on by computing device. "Automatic speech recognition (ASR)" also known as "speech recognition" or "speech to text" is a computer algorithm that may receive an input of audio data, wherein the audio data may include any recognizable sounds and convert those sounds into text-based data. For example, a computing device 104 may output text data indicating that a car horn was heard in the audio-visual data. In another non limiting example, a computing device 104 may output speech related to a conversation that was recorded within the audio-visual data. A computing device, such as the one mentioned herein may receive audio or audio-visual data, beak down the audio data into a plurality of phonemes, determine a sequence of the phonemes, compare the sequence to a plurality of sequence, and output a text based on the comparison of the plurality of sequences. ASR algorithms may use a plurality of algorithms to convert speech to text. This may include, but is not limited to hidden Markov models, dynamic time warping based speech recognition, neural networks, machine learning algorithms and any other algorithms that may convert text to speech. In some cases, receiving user data 116 may include transmitting user data 116 to an ASR device, wherein the ASR device is a device configured to convert audio data to speech. In some cases, the ASR device is communicatively connected to computing device. In some cases, the ASR device is wired or wirelessly connected to computing device. In some cases, computing device 104 includes ASR device. In some cases, ASR device may be connected to a network, wherein computing device 104 may transmit user data 116 to the network for processing. In some cases, ASR device is a preprogrammed device capable of speech to text recognition. In some cases, computing device 104 may implement already existing speech to text software or algorithms. Additionally, or alternatively, receiving user data 116 may include receiving text data from an ASR device. User data 116 may further be received using a data crawler or a data scraper, wherein the data crawler is configured to search the internet, computing device 104 or any other device for data relating to a user. Data crawler may be used to extract data from a user's social medial profile and the like.

With continued reference to FIG. 1, receiving user data 116 may further include processing user data 116 using an image classifier. An "image classifier," as used in this disclosure is a machine-learning model, such as a mathematical model, neural net, or program generated by a machine-learning algorithm known as a "classification algorithm," as described in further detail below, that sorts inputs of image information into categories or bins of data, outputting the categories or bins of data and/or labels associated therewith. Image classifier may be configured to output at least a datum that labels or otherwise identifies a set of images that are clustered together, found to be close under a distance metric as described below, or the like. Computing device 104 and/or another device may generate image classifier using a classification algorithm, defined as a process whereby computing device 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In some cases, Processor 108 may use an image classifier to identify a key image in user data 116. As used herein, a "key image" is an element of visual data used to identify and/or match elements to each other. An image classifier may be trained with binarized visual data that has already been classified to determine key images in user data 116. "Binarized visual data" for the purposes of this disclosure is visual data that is described in binary format. For example, binarized visual data of a photo may be comprised of ones and zeroes wherein the specific sequence of ones and zeros may be used to represent the photo. Binarized visual data may be used for image recognition wherein a specific sequence of ones and zeroes may indicate a product present in the image. An image classifier may be consistent with any classifier as discussed herein. An image classifier may receive an input of user experience and output a key image of user data 116. An identified key image may be used to locate a data entry relating to the image data in user data, such as an image depicting a significant event. In an embodiment, image classifier may be used to compare visual data in user data 116 with visual data in another data set, such as previously inserted user data 116. In the instance of a video, Processor 108 may be used to identify a similarity between videos by comparing them. Processor 108 may be configured to identify a series of frames of video. The series of frames may include a group of pictures having some degree of internal similarity, such as a group of pictures having similar components, scenery, location and the like depicted within them or similar color profiles. In some embodiments, comparing series of frames may include video compression by inter-frame coding. The "inter" part of the term refers to the use of inter frame prediction. This kind of prediction tries to take advantage from temporal redundancy between neighboring frames enabling higher compression rates. Video data compression is the process of encoding information using fewer bits than the original representation. Any compression may be either lossy or lossless. Lossless compression reduces bits by identifying and eliminating statistical redundancy. No information is lost in lossless compression. Lossy compression reduces bits by removing unnecessary or less important information. Typically, a device that performs data compression is referred to as an encoder, and one that performs the reversal of the process (decompression) as a decoder. Data compression may be subject to a space-time complexity trade-off. For instance, a compression scheme for video may require expensive hardware for the video to be decompressed fast enough to be viewed as it is being decompressed, and the option to decompress the video in full before watching it may be inconvenient or require additional storage. Video data may be represented as a series of still image frames. Such data usually contains abundant amounts of spatial and temporal redundancy. Video compression algorithms attempt to reduce redundancy and store information more compactly.

With continued reference to FIG. 1, processing user data 116 may include classifying user data 116 to a target class, using target machine learning model 124, such as a classifier, to organize the target classes. As used in this disclosure, a "target class" is a grouping of user data 116 based on the particular issue that is described within user data in relation to a user goal. As a non-limiting example, target classes may include social target, assertive target, financial target, self-image target, work target that may be present within user data 116. A target classifier may be used to label various data present within user data 116. For example, data within user data 116 indicating that a user lacks proper communicative skills may be labeled with a social target label. In another non limiting example, data within user data 116 indicating that a user lacks proper assertion skills may be labeled with an assertive target label. Processor 108 may classify user data to a target class in order to generate user goals not specifically received by the user. For example, user may list a goal of wanting to travel the world but, wherein processor may determine financial based user goals that relate to achieving the travel goal. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. For example, Processor 108 may generate and train a target classifier configured to receive user data 116 and output at least a target class. Processor 108 and/or another device may generate a classifier using a classification algorithm, defined as a process whereby a Processor 108 derives a classifier from training data. In some cases target classifier may use data to prioritize the order in of labels within user data 116. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A target classifier may be trained with training data correlating user data 116 to target groupings, such as, social target, self-image target, assertive target and the like. Training data may be received from an external computing device, user input, and/or previous iterations of processing. A target classifier may be configured to input user data 116 and categorize components of user data 116 to one or more target groupings.

With continued reference to FIG. 1, Processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, receiving user data 116 may further include processing user data 116 using optical character recognition. Optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes. in some cases OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition. in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component. In some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text. In some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 3-5. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States. in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 2-4. In some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, OCR may be used to process data such as PDF files, images containing texts, lists of credit card transactions, documents indicating financial history and any other files or documents that may contain text. Computing device 104 may then convert the files mentioned above into text-based data that may be used for data manipulation later on.

With continued reference to FIG. 1, processor 108 may be configured to receive user data 116 as a function of an interaction between a user and a chatbot. For the purposes of this disclosure a "chatbot" is a computer program that simulates and processes human conversation. Chatbot may interact with a user in order to receive user data 116. In some cases, chatbot may simulate a human in order to receive user data 116 through a conversation that occurred with the user. As opposed to ordinarily typing in information, a chatbot may engage and stimulate a user such that a user may properly input information and not feel discouraged from doing so. In some cases, chatbot may ask a user a series of questions, wherein the series of questions are requests for data. The series of questions may mimic ordinary human interaction in order to engage a user into inputting data. Chatbot is described in further detail below. Chatbot may include a language processing module as described below. In some embodiments, chatbot may use a large language model to generate responses. A "large language model," for the purposes of this disclosure, is a language model that has been trained using a large dataset containing a variety of different types of data. Large language model may include GPT, GPT-2, GPT-2, GPT-4, Bard, and the like. Large language models may use a transformer architecture. Transformer architectures may use an attention mechanism in order to determine what words to attend to when generating an output.

Still referring to FIG. 1, any data as described in this disclosure (e.g., user data) may be represented as a vector. As used in this disclosure, "vector" is a data structure that represents one or more quantitative values. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes.

With continued reference to FIG. 1, memory 112 contains instructions configuring processor 108 to generate zone strategies based on the user data 116. "Zone strategies" for the purposes of this disclosure is data containing approaches and/or strategies that may aid a user in achieving their goal. Zone strategies may contain at least one individual zone strategy. "Individual zone strategy" as described herein is data containing a singular approach or strategy that may aid a user in increasing or maintaining their goal. Zone strategies may contain at least one individual zone strategy such as, but not limited to, strategies such as, focusing on progress and not perfection, using positive focus to celebrate achievements, keeping focus days free of stuff and messes, developing new capabilities that drive future growth, using strategies to transform obstacles into solutions, connecting with professionals around you, focusing on achieving the first 80% of any project or activity, using a weekly planner to track results. Zone strategies may curate methods a user may implement in their life to achieve their wants and desire. For Example, for a user goal 120 of achieving a luxury car, zone strategy may include steps based on financial user data, such as suggesting monthly saving goals, in order to achieve the want of the user purchasing the vehicle. Zone strategies may further contain more than one individual zone strategies. Individual zone strategy may contain steps or stages for a user to perform to complete the strategy. For example, individual zone strategy containing a strategy to finish a project or activity as described above, may contain a first step instructing a user to start an activity in the morning, a second step instructing a user to create an outline, a third step to prioritize smaller tasks and so on. Zone strategies may be specific to user data 116. For example, zone strategies may contain strategies to improve or maintain social interactions when user data 116 contains data relating to social interactions. This may include, but is not limited to strategies such as, speaking in front of a mirror, engaging in more conversations, talking to strangers, speaking in smaller crowds and the like. Zone strategies may include more than one individual zone strategies that are correlated to or associated with user data 116 wherein each individual zone strategy is configured to help the user achieve their goals. Zone strategies may be retrieved from a database. Zone strategies may be generated by a user, such as a psychologist, a life coach, a mentor, a $3^{rd}$ party and the like. In addition, zone strategies may be input into apparatus by a user, psychologist, life coach, mentor, $3^{rd}$ party and the like. Database may include a multiplicity of individual zone strategies wherein each individual zone strategy may be related to a particular topic. Zone strategies may be selected from a multiplicity of individual zone strategies, wherein zone strategies is one or more individual zone strategies that are related to or correspond to the goal of a user. The multiplicity of individual zone strategies may be stored on a database, wherein computing device 104 selects individual zone strategies that are associated with user data 116. In some cases, individual zone strategy may contain a label that groups individual zone strategy to a target class. Computing device 104 may then select zone strategies wherein each individual zone strategy corresponds to a label within user data 116 as described above. In some cases, generating zone strategies may include obtaining a multiplicity of individual zone strategies from a database and selecting at least one individual zone strategy from the multiplicity of individual zone strategies. In some cases, selecting at least one individual zone strategy from the multiplicity of individual zone strategies may include using a rule-based engine. Rule-based engine may include a zone strategy rule. As used in this disclosure, a "rule-based engine" is a system that executes one or more rules such as, without limitations, zone strategy rule, in a runtime production environment. As used in this disclosure, a "zone strategy rule" is a pair including a set of conditions and a set of actions, wherein each condition within the set of conditions is a representation of a fact, an antecedent, or otherwise a pattern, and each action within the set of actions is a representation of a consequent. In a non-limiting example, zone strategy rule may include a condition of "user inputs user data 116 corresponding to category or class X" pair with an action of "select at least one individual zone strategy within the category or class X." In another non-limiting example, user may input user data 116 having a user goal 120 of "financial improvement" wherein input of said user goal 120 may execute a rule to receive zone strategies related to financial improvement from a multiplicity of individual zone strategies as described below. In yet another non limiting example, zone strategy rule may include a condition wherein user inputs user data correlated to particular target class paired with an action of "selecting at least one individual zone strategy associated with the particular target class. In some embodiments, rule-based engine may execute one or more zone strategy rules if any conditions within one or more zone strategy rules are met. As a non-limiting example, one or more zone strategy rules may be implemented if one or more user data 116 are inputted.

With continued reference to FIG. 1, generating zone strategies 128 may include generating the zone strategies 128 using a zone strategy machine learning model. Processor 108 may use a machine learning module, such as a machine learning module for the purposes of this disclosure, to implement one or more algorithms or generate one or more machine-learning models, such as an assessment machine learning model, to calculate at least one smart assessments. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from a database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. A machine learning module, such as zone strategy module, may be used to generate zone strategy machine learning model 132 and/or any other machine learning model using training data. Zone strategy machine learning model 132 may be trained by correlated inputs and outputs of training data. Training data may be data sets that have already been converted from raw data whether manually, by machine, or any other method. Zone strategy training data may be stored in a database. Zone strategy training data may also be retrieved from database.

With continued reference to FIG. 1, generating zone strategies 128 based on user data 116 may include receiving zone strategy training data. In an embodiment, zone strategy training data may include a plurality of user data 116 correlated to a plurality of zone strategies. For example, zone strategy training data may be used to show a particular user data 116 is correlated to one of a plurality of zone strategies, wherein each of the plurality of the zone strategies 128 contains strategies for a user that are related to user data 116. In some cases, training data may include a plurality of user goals that are correlated to a plurality of zone strategies. In some embodiments, zone strategy training data may be received from a user, third party, database, external computing devices, previous iterations of processing, and/or the like as described in this disclosure. Zone strategy training data may further be comprised of previous iterations of user data 116 and/or zone strategies. zone strategy training data may be stored in a database and/or retrieved from a database. Generating zone strategies 128 may further include training a zone strategy machine learning model 132 as a function of zone strategy training data and generating zone strategies 128 as a function of zone strategy machine learning model. In some cases, zone strategy training data may be trained through user input wherein a user input may determine if zone strategies 128 is accurate and/or applicable to the current user data 116. In some cases, zone strategies 128 may be generated using a lookup table. Processor 108 may be configured to lookup up particular zone strategies 128 or individual zone strategies 128 based on user goal 120. For example, a particular user goal 120 may be associated with a particular individual zone strategy, wherein zone strategies 128 contains at least on individual zone strategy. Lookup table includes any lookup table as described in this disclosure.

With continued reference to FIG. 1, memory 112 further contains instructions configuring processor 108 to receive a plurality of zone strategy scores 136 from a user as a function of zone strategies. "Zone strategy score," as used herein, is a score that is associated to each individual zone strategy in zone strategies. Each zone strategy score indicates a user's competence, experience, engagement, proficiency, familiarity and/or ability to perform with respect to each individual zone strategy in zone strategies. For example, plurality of zone strategy scores 136 may contain a numerical score for a particular individual zone strategy such as "using a weekly planner to track results" wherein the score indicates a user's engagement with said individual zone strategy. In said example, a lower score may be associated with a particular individual zone strategy if a user does not regularly engage or accomplished said strategy. Plurality of zone strategy scores 136 may be numerical scores ranging from 1-5, 1-10, and/or 1-100 wherein a lower score may indicate that a user is not actively engaging in the strategy and a higher numerical score may indicate a higher involvement or engagement of the strategy. In some cases, plurality of zone strategy scores 136 may contain data such as "low" "medium" or "high" wherein an indication of "low" may indicate low involvement of the strategy and an indication of "high" may indicate a high involvement of the individual strategy. Plurality of zone strategy scores 136 may be used to indicate a user's involvement in each individual strategy. In some cases at least one zone strategy score of the plurality of zone strategy scores 136 is correlated to an individual zone strategy of the zone strategies. Receiving a plurality of zone strategy scores 136 may include receiving the plurality of zone strategy scores 136 from a user. Computing device 104 and/or apparatus 100 may request input from a user wherein a user may input plurality of zone strategy scores. Apparatus 100 may contain interactive components as described below wherein a user may interact with interactive components in order to rank or score each individual zone strategy. In some cases, plurality of zone strategy scores 136 may contain previous score data, wherein previous score data is data of a previous set of plurality of zone strategy scores 136 of a user. Previous score data may include scores of a previous iteration of the process, wherein a user entered plurality of zone strategy scores 136 on a previous date or before the current iteration. Previous score data may be retrieved from a database. Plurality of zone strategy scores 136 may be transmitted to a database and used as previous score data for a future iteration.

With continued reference to FIG. 1, receiving plurality of zone strategy scores 136 may include receiving a plurality of zone strategy scores 136 as a function of zone strategies 128 and the user data 116. Computing device 104 may generate plurality of zone strategy scores 136 as opposed to a user, wherein computing device 104 may use a classifier, or a machine learning model as described in this disclosure to generate zone strategy scores 136 based on user data 116. For example, computing device 104 may generate a lower zone strategy score for a particular individual zone strategy when user data 116 indicates that a user is struggling with a particular confidence related issue. In some cases plurality of zone strategy scores 136 may be received by utilizing a score machine learning model. Score machine learning model may be trained with a score training data. score training data may include a plurality of user data 116 and a plurality of the zone strategies 128 correlated to a plurality of the plurality of zone strategy scores. In some embodiments, score training data may include a plurality of user data 116 correlated to a plurality of zone strategy scores. In an embodiment, score training data may be used to show that a particular datum or data within user data 116 is associated with zone strategy score. In some instances, score training data may be generated from previous iterations of score machine learning inputs and respective outputs. In some embodiments, score training data may include a combination of historical inputs correlated to historical outputs that fall within a threshold value of an output associated therewith. As a non-limiting example, a first iteration of score machine learning model may have a historical input that may have a particular output, but the second iteration may have a different, distinct, input/output combination. For a third iteration, score machine learning model may be trained with training data that correlates inputs from the first iteration and outputs of the second iteration, as long as outputs of the second iteration fall within a threshold value of the outputs of the first iteration. Combining historical inputs and outputs may add variance to score machine learning model to create a more robust machine learning model.

With continued reference to FIG. 1, zone strategy scores may be generated using an optimization algorithm performed by a machine-learning model as described above to rank zone strategies 128 by an objective function. Optimization algorithms are designed to find the best solution to a given problem by systematically exploring possible solutions and selecting the one that optimizes a specific objective function. In the context of zone strategies 128, the goal is to find an optimal zone strategies 128 while satisfying various constraints and maximizing or minimizing a certain criterion derived from user data 116. The application of optimization algorithms ranking zone strategies involves defining an objective function and formulating the problem as an optimization task. The objective function quantifies the goal of the optimization. It could be minimizing the physical, psychological, and/or mental stress a zone strategy may put on a user. Decision variables represent the parameters that the optimization algorithm can adjust to find the optimal solution. These variables could associable resources of the user, geographic location of the user, stamina, endurance, mental fortitude, personality traits, and the like of the user. Constraints are conditions that the zone strategy/solution must satisfy. Examples of constraints in scheduling include correlated goals derived by processer 104 based on the target class, such as achieving a financial goal to achieve the overall goal of traveling the world. A plurality of constraints may be derived based on target classification of user data and the like. In an example applying a optimization algorithm, the objective function may be to achieve financial stability as defined by the user. The decision variables may be current salary, debts, investments, and other data extracted from user data 116. Constraints may be time frames a user is able to work for money, geographic location providing opportunities for the user to work, deadlines to pay debts, and the like. An optimization algorithm, such as a or mixed-integer programming may rank zone strategies 128 based on based on these parameters.

Still referring to FIG. 1, performing an optimization algorithm may include implementing a regression model. Regression models are particularly useful when there is a need to estimate a numerical value, such as the time required for a specific task. Regression models may include linear regression, decision tree regression, or more complex models like random forest regression or gradient boosting regression. Implementing a regression model may include gathering historical data on zone categories, user data 116, such as trends in behavior, and the like. In light of receiving a user goal, processor 108 can use the regression model to estimate the optimal zone strategies 128 based on user's likelihood to succeed in implementing the strategy.

With continued reference to FIG. 1, zone strategy scores 136 may include scores from a previous date and/or previous iteration wherein a user may view previous scores generated and the change in scores over a predetermined amount of time. For example, zone strategy scores 136 may include a current score from the current iteration indicating a particular score and a previous score from a previous iteration indicating a similar particular score. A user may be able to use the scores for comparison and to determine if the user has progressed since the previous iteration. In some cases zone strategy scores 136 may be stored and/or retrieved on a database and/or a storage wherein computing device may store zone strategy score and display them to a user as a previous score in a future iteration. In some cases zone strategy scores may contain and/or be associated with a particular date wherein a user may be able to view the time or date of the previous score and the amount of progress or regress since the particular date.

With continued reference to FIG. 1, memory 112 further contains instructions configuring processor 108 to determine follow through data 140 as a function of the plurality of zone strategy scores 136 and the zone strategies. "Follow through data" for the purposes of this disclosure are instructions configured to aid a user in improving on each individual zone strategy in zone strategies. A combination of plurality of zone strategy scores 136 and zone strategies 128 may indicate that a user is competent or engaged in one individual zone strategy while not engaged or component in another individual zone strategy. Follow through data 140 may provide instructions on how a user may improve on each individual zone strategy. Improvements may include modification to a zone strategy by changing a timer parameter, objective, strategy of implementation, resources provided, and the like. For example an original zone strategy requiring a user to complete an assignment within an hour may be modified to completing an assignment within 2 hours. Additionally or alternatively, follow through data 140 may include instructions that are specific to each zone strategy score that is associated with each individual zone strategy. For example, a user who may have a zone strategy score of 2 out of 5 in a particular individual zone strategy may receive differing instructions in follow through data 140 as a user who may have a zone strategy score of 4 out of 5 for a differing particular individual zone strategy. Follow through data 140 may include data on how a user may improve on each individual zone strategy and how to improve the score for future iterations. This may include more detailed instructions on how to be proficient in an individual zone strategy or instructions signifying that a particular individual zone strategy may need to be prioritized over another individual zone strategy. In a non-limiting example, follow through data 140 may instruct a user on how to begin a project or how to properly designate time with respect to an individual zone strategy, such as an individual zone strategy instructing a user to focus on achieving the first 80% of any project or activity. Continuing the example, follow through data 140 may instruct a user to attend a course when a user has a low zone strategy score. However, follow through data 140 may instead instruct a user on a simpler task and/or set of instructions if a user has a higher zone strategy score. In some cases, determining follow through data 140 may further include determining a change in previous score data and plurality of zone strategy scores. A change in previous score data and plurality of zone strategy scores 136 may indicate that a user has improved since the last iteration. For example, previous score data containing a score of 2 and plurality of zone strategy scores 136 containing a zone strategy score of 4 with relation to individual zone strategy may indicate that a user has improved since the previous iteration. Follow through data 140 may be generated as a function of the comparison wherein follow through data 140 may contain instructions and/or steps on how a user may continue to improve or maintain their goals. In some cases, the comparison between previous score data and zone strategy score may indicate that a user has decreased their improvement since the previous iteration. As a result, computing device 104 may generate follow through data 140 that is responsive to the change in zone strategy score in order to ensure that a user improves their plurality of zone strategy scores 136 for the next iteration. In some cases, follow through data 140 generated as a function of the comparison between previous score data and plurality of zone score may contain instructions that are different from follow through data 140 generated as a function of plurality of zone strategy scores. Additionally, or alternatively, follow through data 140 generated on a second, third, or fourth (and so on) iteration wherein previous score data may retrieved, may be different from follow through data 140 generated on a first iteration. Follow through data 140 may be generated using a machine learning model as a function of the comparison between previous score data and plurality of zone strategy scores. Training data may contain a plurality of comparisons between previous score data and zone strategies 128 correlated to a plurality of follow through data, wherein a particular comparison may indicate a particular follow through data. In some embodiments, training data may be received from a user, third party, database, external computing devices, previous iterations of processing, and/or the like as described in this disclosure. Training data may be stored in a database and/or retrieved from a database. In some cases, follow through data 140 may be determined using a lookup table where in a particular individual zone strategy and/or zone strategy score may be used to lookup a particular follow through data 140. Additionally, or alternatively, Follow through data 140 may be determined using a lookup table wherein each individual zone strategy of zone strategies 128 and/or each individual zone score of plurality of zone scores is used to lookup follow through data Still referring to FIG. 1, goals and/or domains within which to measure one or more zone strategies may include, without limitation, attribute clusters and/or outlier clusters as identified and/or described in U.S. Pat. No. 11,868,859, filed on Apr. 28, 2023 and entitled "SYSTEMS AND METHODS FOR DATA STRUCTURE GENERATION," the entirety of which is incorporated by reference herein.

With continued reference to FIG. 1, follow through data 140 may include improvement data. "Improvement data" for the purposes of this disclosure is data describing a user's engagement or lack thereof with a zone strategy over a given period of time. Improvement data may be determined by comparing current data from user data 116 and previously entered user data from current data. Improvement data may indicate or contain data that a user has improved over a particular period of time based on the current data and previously entered user data 116. Improvement data may also indicate that a goal sought in the current iteration is different than a goal sought in a previous iteration. Improvement data may also be determined based on previous score data generated or received from a previous iteration of the processing, and plurality of zone strategy scores generated from the current iteration of the processing. Improvement data may include data signifying to a user that the user has improved on their goals or their confidence since a previous iteration. Improvement data may further include data signifying that a user has maintained their goals or has regressed since the previous iteration. Improvement data may be generated by determining a difference between previous score data and plurality of zone strategy scores and outputting improvement data as a function of the difference. For example, when previous score data indicates that a user had a zone strategy score of 3 out of 5 on a previous iteration and a user may now have a score of 1 on the current iteration, improvement data may be generated as function of the difference which would be −2. Improvement data may be generated using a lookup table wherein each difference is correlated to data within the lookup table. A "lookup table" for the purposes of this disclosure is an array of predetermined values wherein each value may be looked up using a key corresponding to that specific value. For example, a value of −2 as described above may contain data within a lookup table of improvement data that is correlated to a drop in one's improvement. Data within the lookup table may include instructions or steps helping a user fix or maintain the difference generated by previous score data and plurality of zone strategy scores. For example, on a difference of −2, computing device may locate data correlated to a −2 difference, wherein the data may include instructions on how to prevent a lowering of one's plurality of zone strategy scores in the future. In another non-limiting example, when a difference of +2 is calculated, data pertaining to a +2 difference on lookup table may include data and/or instructions on how to maintain one's plurality of zone strategy scores and the like. The lookup table may be retrieved from a database and/or generated by a user. In some embodiments, at least a processor 108 may 'lookup' a given difference to one or more lists improvement data.

With continued reference to FIG. 1, follow through data 140 may include at least one follow through plan. A "follow through plan" as described in this disclosure is an individual plan within follow through data 140 that is correlated to at least one individual zone strategy. In some cases follow through data 140 may include a plurality of follow through plans wherein each follow through plan of the plurality of follow through plans is correlated to at least one individual zone strategy within zone strategies. In an embodiment, follow through plan may be used to instruct a user on how to improve on a particular individual zone strategy. In instances wherein zone strategies may contain more than one individual zone strategies, follow through data 140 may contain multiple follow through plans wherein each follow through plan may contain data instructing a user on how to improve on a particular individual zone strategy. For example, regarding a zone strategy suggesting a user create a weekly spending budget in order to reach a financial goal, follow through data 140 may include a plan advising a user to meal weekly meals in advance to prevent frivolous spending. In some cases, follow through data 140 may contain one follow through plan, wherein the one follow through plan is a set of instructions that that are universal and/or encompass multiple individual zone strategies within zone strategies.

With continued reference to FIG. 1, follow through data 140 may be determined as a function of the plurality of zone strategy scores and zone strategies using a follow through machine learning model. Determining follow through data 140 as a function of plurality of zone strategy scores and zone strategies includes receiving follow through training data. In an embodiment, follow through training data may include a plurality of the zone strategies and a plurality of the plurality of zone strategy scores correlated to a plurality of follow through data. For example, follow through training data may be used to show a particular zone strategies and plurality of zone strategy scores that is correlated to one of a plurality of follow through data. In an embodiment, follow through data 140 may be used to instruct a user on how to improve or increase their zone strategy scores that are associated to each individual zone strategy. In some embodiments, follow through training data may be received from a user, third party, database, external computing devices, previous iterations of processing, and/or the like as described in this disclosure. Follow through training data may further be comprised of previous iterations of zone strategies and plurality of zone strategy scores and follow through data. Follow through training data may be stored in a database and retrieved from a database. Determining follow through data 140 may further include training a follow through machine learning model as a function of follow through training data and determining follow through data 140 as a function of follow through machine learning model. In some cases, follow through training data may be trained through user input wherein a user may determine if an output containing follow through data 140 is accurate and/or applicable to the current goal of a user.

With continued reference to FIG. 1, memory 112 further contains instructions to create a user interface data structure 144. As used in this disclosure, "user interface data structure" is a data structure representing a specialized formatting of data on a computer configured such that the information can be effectively presented for a user interface. User interface data structure 144 includes zone strategies and follow through data. In some cases, user interface data structure 144 further includes any data as described in this disclosure, such as user data, plurality of zones strategy scores and the like. Additionally, or alternatively, Processor 108 may be configured to generate user interface data structure 144 using any combination of data as described in this disclosure With continued reference to FIG. 1, memory 112 further contains instructions to transmit the follow through data, the zone strategies and the user interface data structure 144. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to a database wherein the data may be accessed from a database, Processor 108 may further transmit the data above to a device display or another computing device.

With continued reference to FIG. 1, apparatus 100 further includes a graphical user interface (GUI) communicatively connected to at least a processor. For the purposes of this disclosure, a "user interface" is a means by which a user and a computer system interact; for example, through the use of input devices and software. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to at least a processor. For example, a smart phone, smart, tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations on. In some embodiments, GUI 148 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. skilled in the art, upon reviewing the entirety of this disclosure, will be aware of various ways in which a graphical user interface and/or elements thereof may be implemented and/or used as described in this disclosure.

With continued reference to FIG. 1, GUI 148 is configured to receive the user interface structure and display the zone strategies and the follow through data 140 as a function of the user interface data structure 144. GUI 148 may be displayed on a display device. Display device may include, but is not limited to, a smartphone, tablet, laptop, monitor, tablet, and the like. Display device may include a separate device that includes a transparent screen configured to display computer generated images and/or information. In some cases, GUI 148 may be displayed on a plurality of display devices. In some cases, GUI 148 may contain an interaction component. "Interaction component" for the purposes of this disclosure is a device or a computer program that is capable of allowing a user to interact with GUI 148. Interaction component may include a button or similar clickable elements wherein the clicking of the button may initiate a response or a command. In some cases, interaction component may allow a user to input plurality of zone strategy scores, wherein interaction component may include a text box or clickable buttons that allow a user to input plurality of strategy scores. In some cases, interaction component may include multiple check boxes on a display, wherein the clicking of a checkbox may indicate to computing device 104 that a specific input was entered. For example, a checking of a checkbox having the number "one" displayed on it, may indicate to computing device 104 that user has entered a score of "1". Interaction component may further contain drop down menus where a user may choose from a list of commands wherein the list of commands may perform different functions. For example, a command may include pausing or stopping the data that is being displayed. In some cases, a command May allow user to process another iteration or go back and input more data. Interaction feature may further include dialog or comment boxes wherein users may enter comments about data that is displayed. Comment boxes may be consistent with user input as described. Interaction component may further allow a user to modify or change data within follow through data. In some cases, interaction component may be used to provide feedback to an operator. In some cases, interaction component may allow a user to provide feedback on follow through data, plurality of zone strategy scores and the like such that machine learning model may be trained to provide better results. In some embodiments, configuring one or more interaction components may include selecting one or more interaction components properties as a function of follow through data. In a non-limiting example, an interaction component with a larger size may be selected to display a first instruction and/or follow through plan of follow through data 140 and another interaction component with a smaller size may be selected to display a second instruction of follow through data 140 and/or a second follow through plan. Other interaction components properties may include, without limitation, color, content, function, animation, and the like thereof.

Figure 2:
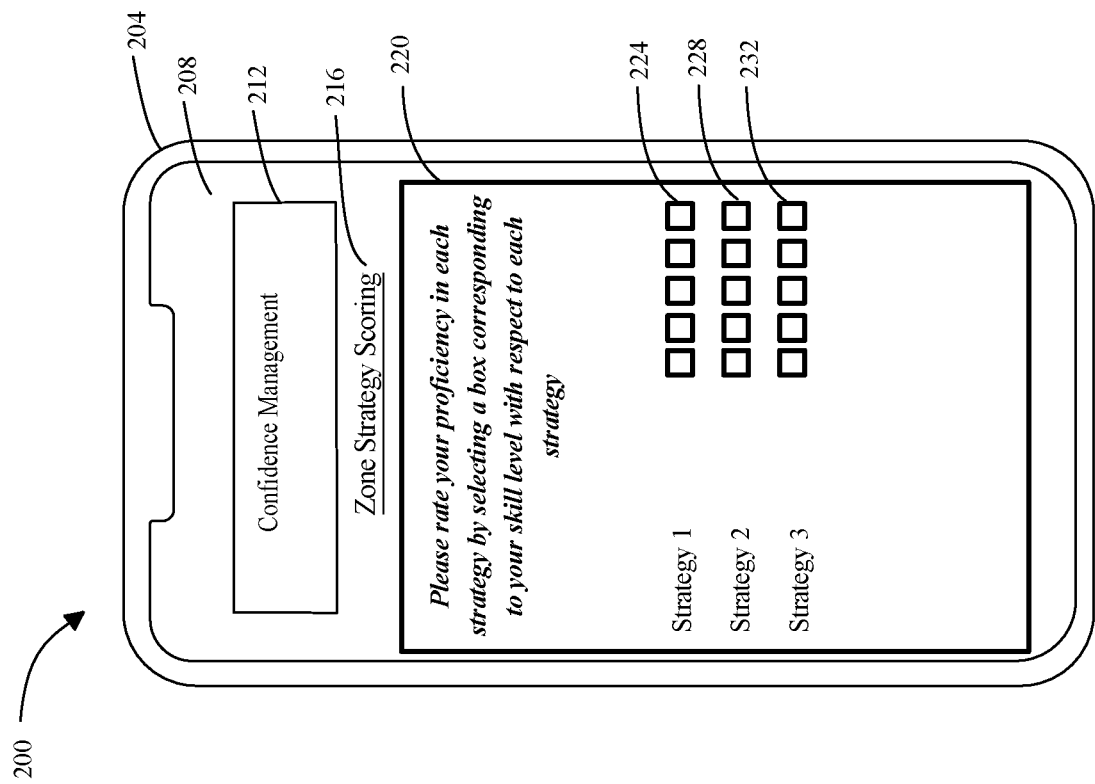
FIG. 2 is an exemplary embodiment of a graphical user interface in accordance with the subject disclosure.

Referring now to FIG. 2, an exemplary embodiment of a GUI 200 on a display device 204 is illustrated. GUI is configured to receive the user interface structure as discussed above and display the zone strategies and the follow through data as a function of the user interface data structure. Display device 204 may include, but is not limited to, a smartphone, tablet, laptop, monitor, tablet, and the like. Display device 204 may further include a separate device that includes a transparent screen configured to display computer generated images and/or information. In some cases, GUI may be displayed on a plurality of display devices. In some cases, GUI may display data on separate windows 208. A "window" for the purposes of this disclosure is the information that is capable of being displayed within a border of device display. A user may navigate through different windows 208 wherein each window 208 may contain new or differing information or data. For example, a first window may display the zone strategies as described in this disclosure, whereas a second window may display the follow through data as described in this disclosure. A user may navigate through a first second, third and fourth window (and so on) by interacting with GUI 200. For example, a user may select a button or box signifying a next window on GUI, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows wherein each window may request or display information to or form a user. In this instance window 208 displays an identification field 212 wherein the identification field signifies to a user, the particular action/computing that will be performed by a computing device. In this instance identification field 212 contains information stating "confidence management" wherein a user may be put on notice that any information being received or displayed will be used for confidence management. Identification field 212 may be consistent throughout multiple windows 208. Additionally, in this instance window may display a sub identification field 216 wherein the sub identification field may indicate to a user the type of data that is being displayed or the type of data that is being received. In this instance, sub identification field 216 contains "zone strategy scoring". This may indicate to a user that computing device may be receiving data for plurality of zone strategy scores as described above. Additionally, window 208 may contain an instruction prompt 220 wherein instruction prompt is configured to instruct a user on how to receive or display the data that is generated by computing device. In this instance, instruction prompt 220 instructs a user to input zone strategies wherein zone strategies may contain one more individual strategies. In this instance, a user is given a first row of check boxes 224 such that a user may rate strategy 1. A user is also given a second row of check boxes wherein a user may rate strategy 2, A user is also given a third row of check boxes, wherein a user may rate strategy 3. Each individual check box of the row of check boxes 224,228,232 may signify a particular score, wherein the checking of one box may signify a lower score and, the checking of a second box may signify a higher score. GUI 200 may be configured to receive input from a user, wherein the input may be used for data manipulation. For example, GUI 200 may receive user data from a user as described above, wherein user data may be used for processing of data. GUI may contain an interaction component as described in this disclosure wherein the interaction component is configured to receive data from a user and allow a user to manipulate data and provide feedback.

Figure 3:
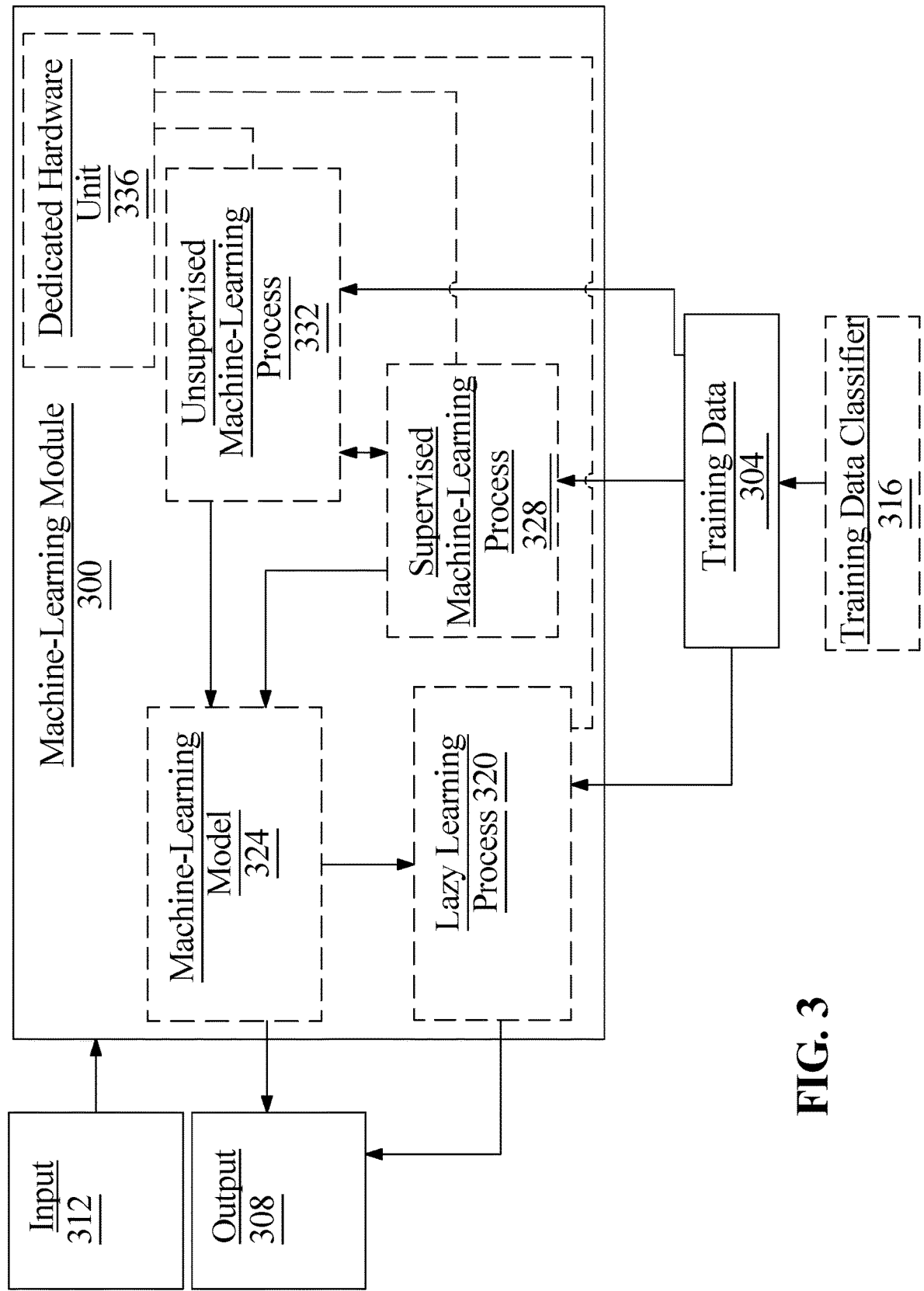
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to target classes as described above, categories of user data such as psychology, mental, and physical traits of a user, and the like. Implementation of machine-learning processes as described in the disclosure improve the processing power of the computing device. Without the implementation of a machine-learning model, there would be a trade in the performance power of 108, such as time and accuracy, in order to sort the data and generate user goal, target classes, zone categories, and the follow through data as described above. The ability to continuously train a machine-learning model cable of learning to identify new trends or correlations within a fluctuating quantity of data is a benefit that would not be realized otherwise, without the tradeoff in performance efficiency.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be. Processor may interpolate the low pixel count image to convert the 100 pixels into pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be. Processor may down-sample the high pixel count image to convert the 256 pixels into pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described in this disclosure as inputs, outputs as described in this disclosure as outputs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry.

Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAS, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
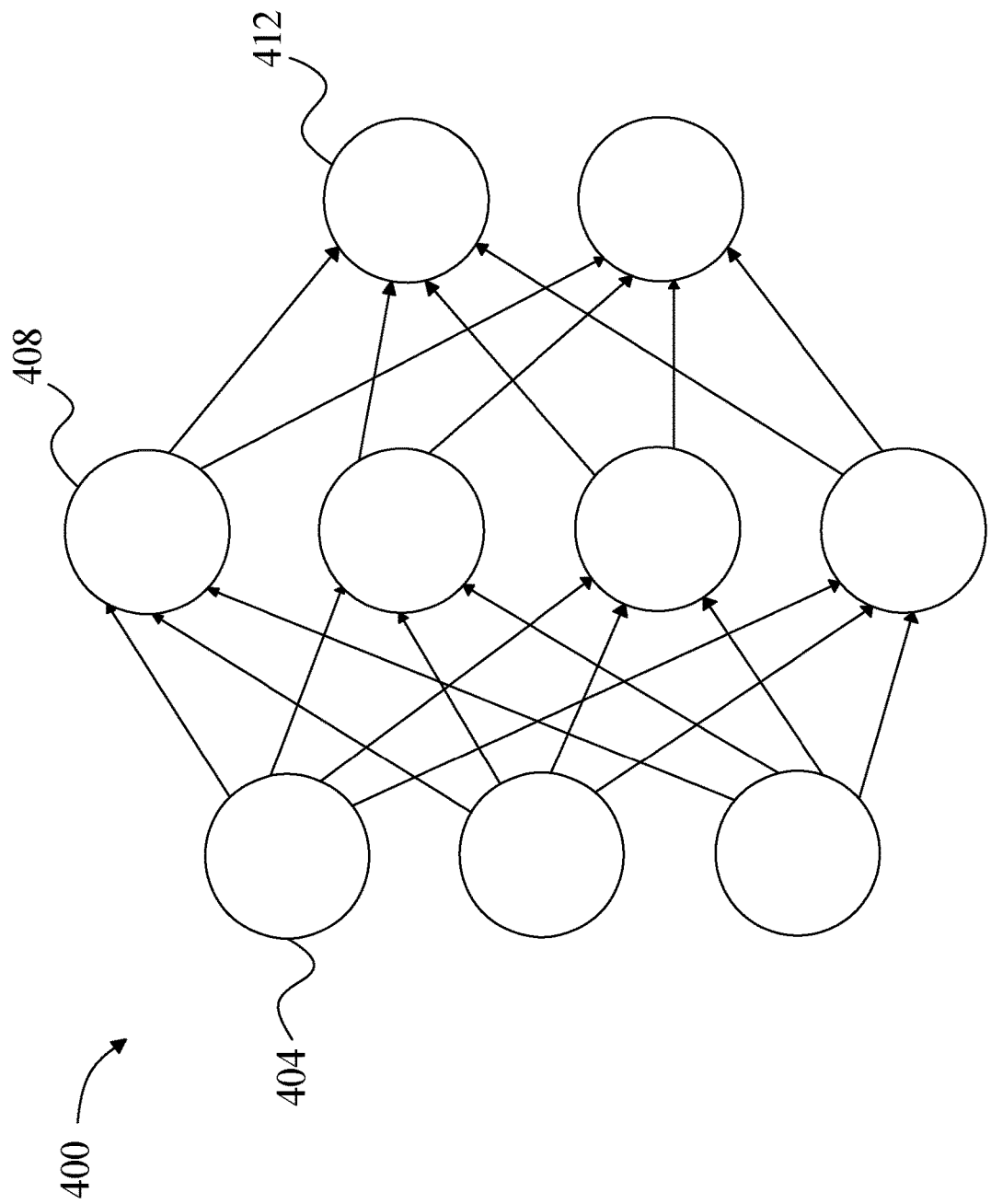
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
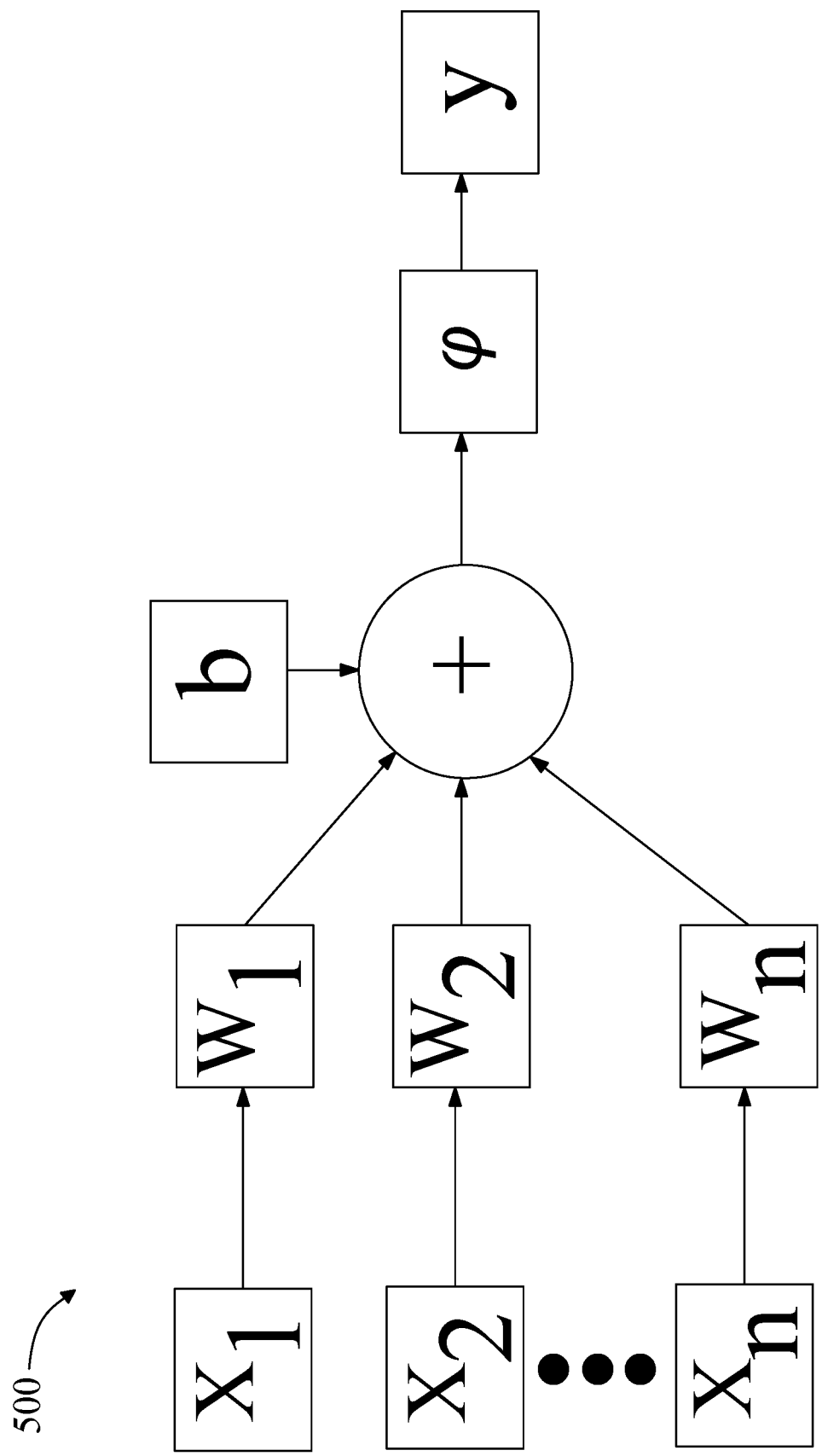
FIG. 5 is a block diagram of an exemplary embodiment of a node.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
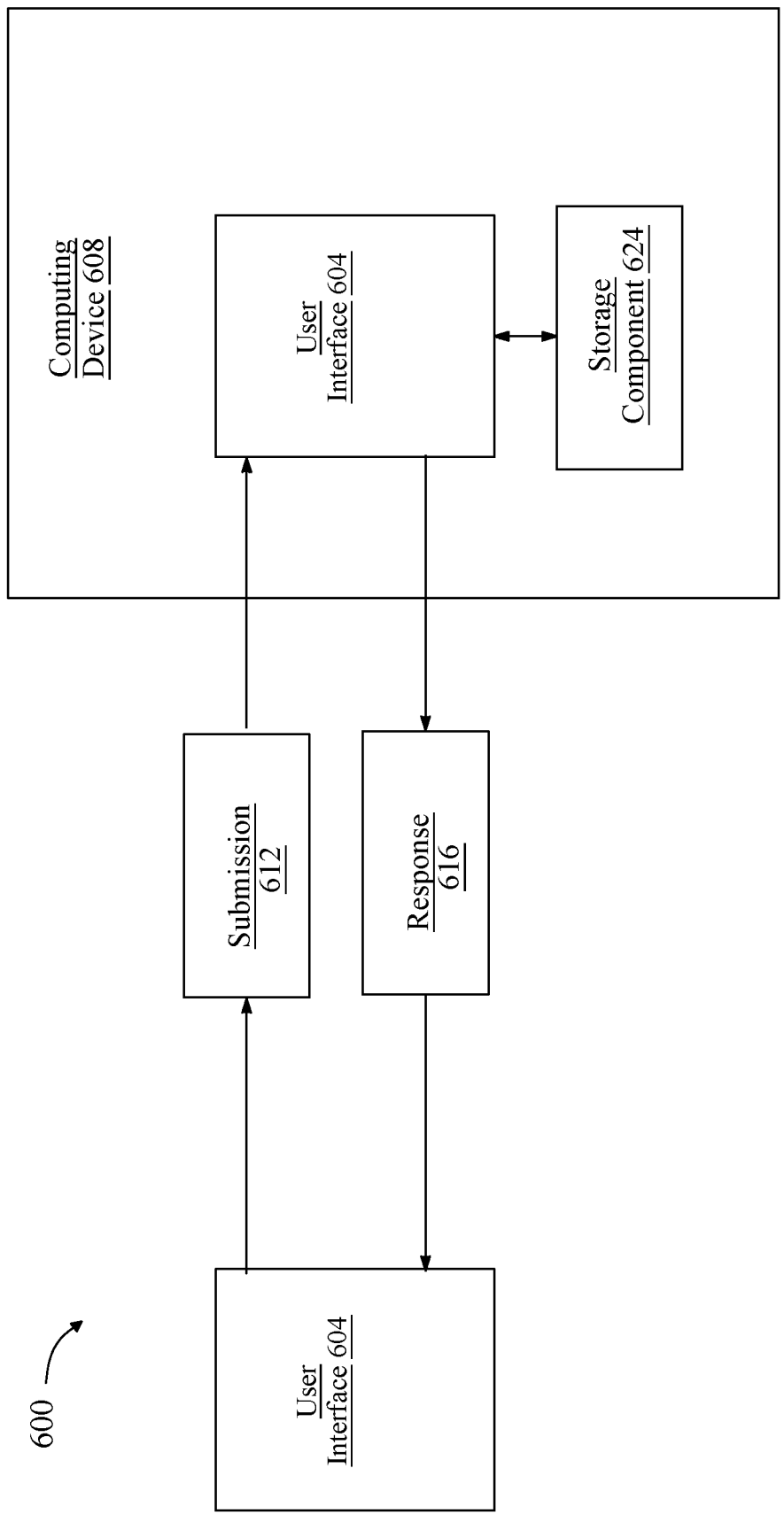
FIG. 6 is a block diagram of a chatbot system.

Referring to FIG. 6, a chatbot system 600 is schematically illustrated. According to some embodiments, a user interface 604 may be communicative with a computing device 608 that is configured to operate a chatbot. In some cases, user interface 604 may be local to computing device 608. Alternatively or additionally, in some cases, user interface 604 may remote to computing device 608 and communicative with the computing device 608, by way of one or more networks, such as without limitation the internet. Alternatively or additionally, user interface 604 may communicate with user device 608 using telephonic devices and networks, such as without limitation fax machines, short message service (SMS), or multimedia message service (MMS). Commonly, user interface 604 communicates with computing device 608 using text-based communication, for example without limitation using a character encoding protocol, such as American Standard for Information Interchange (ASCII). Typically, a user interface 604 conversationally interfaces a chatbot, by way of at least a submission 612, from the user interface 608 to the chatbot, and a response 616, from the chatbot to the user interface 604. In many cases, one or both of submission 612 and response 616 are text-based communication. Alternatively or additionally, in some cases, one or both of submission 612 and response 616 are audio-based communication.

Continuing in reference to FIG. 6, a submission 612 once received by computing device 608 operating a chatbot, may be processed by a processor 620. In some embodiments, processor 620 processes a submission 612 using one or more of keyword recognition, pattern matching, and natural language processing. In some embodiments, processor employs real-time learning with evolutionary algorithms. In some cases, processor 620 may retrieve a pre-prepared response from at least a storage component 624, based upon submission 612. Alternatively or additionally, in some embodiments, processor 620 communicates a response 616 without first receiving a submission 612, thereby initiating conversation. In some cases, processor 620 communicates an inquiry to user interface 604; and the processor is configured to process an answer to the inquiry in a following submission 612 from the user interface 604. In some cases, an answer to an inquiry present within a submission 612 from a user device 604 may be used by computing device 104 as an input to another function.

Figure 7:
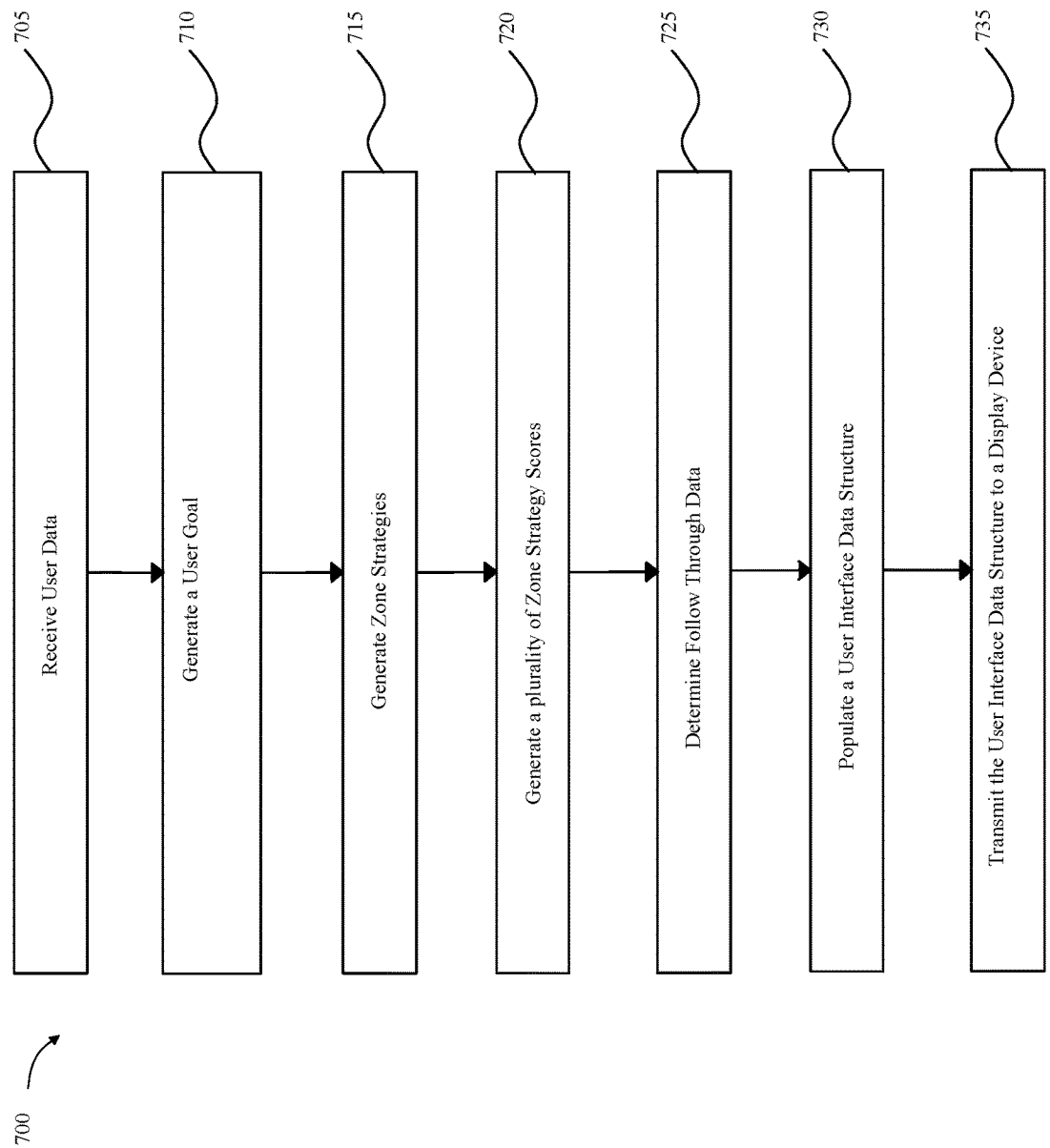
FIG. 7 is a flow diagram illustrating an exemplary embodiment of a method for zone strategy selection.

Referring now to FIG. 7, an exemplary flow diagram of a method 700 for zone strategy selection. At step 705, method 700 includes receiving, by a processor, user data. This may be implemented as described in and with reference to FIGS. 1-6. At step 710, method 700 classifying, by the at least a processor, the user data to a plurality of target classes using a target classifier. This may be implemented as described in and with reference to FIGS. 1-6. At step 715, method 700 includes generating, by the at least a processor, a user goal as a function of the plurality of target classes. This may be implemented as described in and with reference to FIGS. 1-6. At step 720, method 700 includes generating, by the at least a processor, a plurality of zone strategies based on the user goal using a zone strategy machine learning model, wherein generating the plurality of zone strategies includes generating a zone strategy score for each zone strategy of the plurality of zone strategies using an optimization algorithm, and ranking the zone strategies by an objective function based on minimizing psychological stress. This may be implemented as described in and with reference to FIGS. 1-6. At step 725, method 700 includes determining, by the at least a processor, follow-through data as a function of the plurality of zone strategy scores and the zone strategies. This may be implemented as described in and with reference to FIGS. 1-6. At step 730, method 700 includes populating, by the at least a processor, a user interface data structure, wherein the user interface data structure includes a visual representation of the zone strategies and the follow-through data. This may be implemented as described in and with reference to FIGS. 1-6. At step 735, method 700 includes transmitting, by the at least a processor, the user interface data structure to a display device communicatively connected to the at least a processor to display the visual representation of the zone strategies and the follow-through data using a graphical user interface (GUI). This may be implemented as described in and with reference to FIGS. 1-6.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
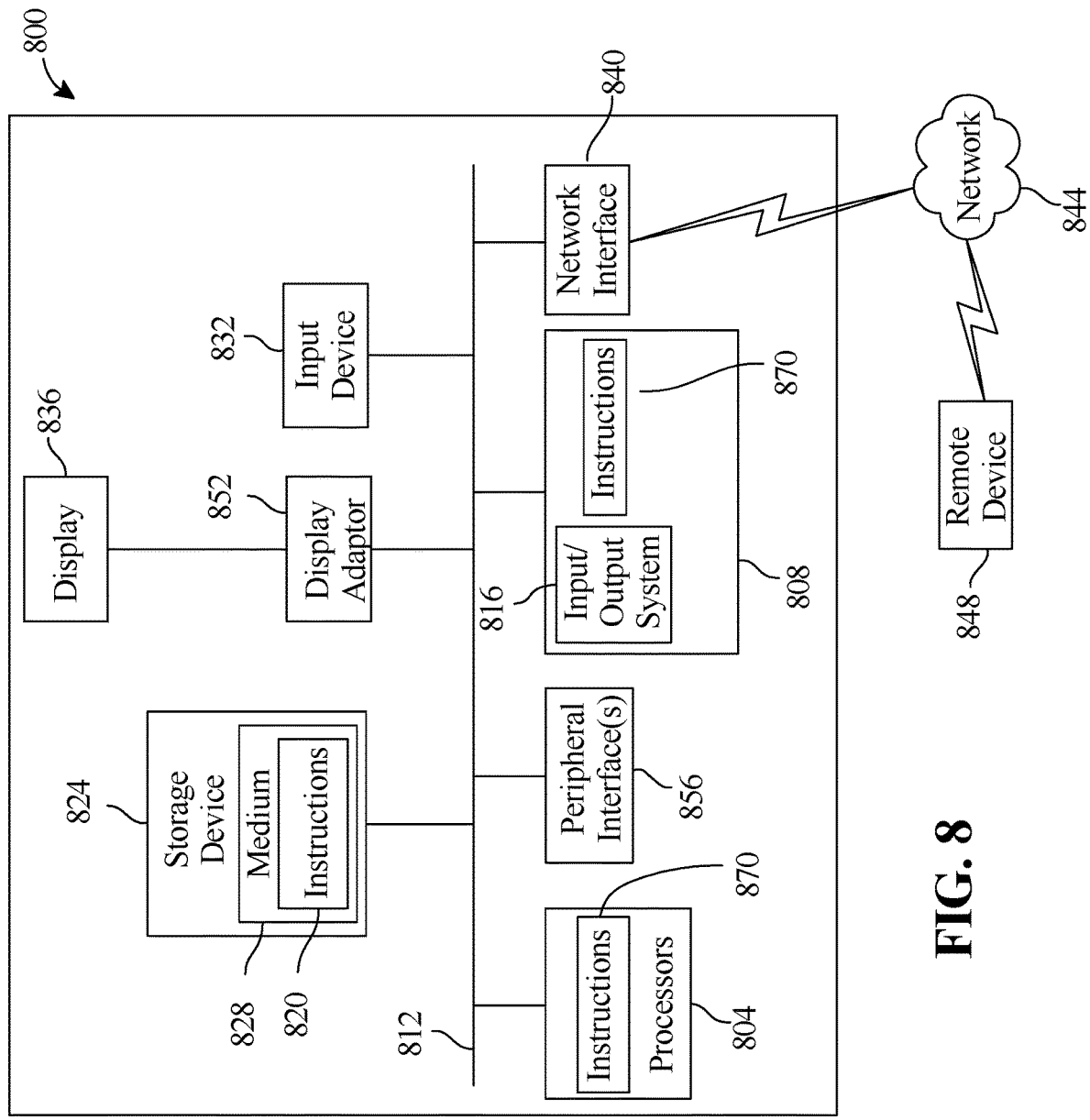
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for optimal zone strategy selection, wherein the apparatus comprises:
   at least a processor;
   a memory communicatively connected to the processor, wherein the memory contains instructions configuring the at least a processor to:
      receive user data;
      classify the user data to a plurality of target classes using a target classifier;
      generate a user goal as a function of the plurality of target classes;

generate a plurality of zone strategies based on the user goal using a zone strategy machine learning model, wherein generating the plurality of zone strategies comprises:
  generate a zone strategy score for each zone strategy of the plurality of zone strategies using an optimization algorithm; and
  ranking the zone strategies by an objective function based on minimizing psychological stress;
determine follow-through data as a function of the plurality of zone strategy scores and the zone strategies;
populate a user interface data structure, wherein the user interface data structure comprises a visual representation of the zone strategies and the follow-through data; and
transmit the user interface data structure to a display device communicatively connected to the at least a processor to display the visual representation of the zone strategies and the follow-through data using a graphical user interface (GUI).

2. The apparatus of claim 1, wherein receiving the user data comprises utilizing a web crawler programmed to autonomously navigate and scrape user data form a plurality of virtual environments.

3. The apparatus of claim 1, wherein the user data further comprises assessment data wherein assessment data comprises a plurality of data elements describing a plurality of physiological traits of a user.

4. The apparatus of claim 1, wherein the user data further comprises current data and a plurality of historical user data.

5. The apparatus of claim 1, wherein the processor is further configured to receive the user data as a function of an interaction between a user and a chatbot.

6. The apparatus of claim 1, wherein the optimization algorithm comprises a regression model configured to determine optimal zone categories based on historical data.

7. The apparatus of claim 1, wherein determining follow-through data as a function of the plurality of zone strategy scores and the zone strategies comprises:
  receiving follow-through training data comprising a plurality of zone strategies and a plurality of zone strategy scores as input correlated to a plurality of follow-through data as output;
  training a follow-through machine learning model as a function of the follow-through training data; and
  determining the follow-through data using the trained follow-through machine learning model.

8. The apparatus of claim 1, wherein the follow-through data further comprises improvement data containing data relating to at least an improvement of a user over a predetermined time interval.

9. The apparatus of claim 1, wherein the follow-through data comprises at least one follow-through plan, wherein the at least one follow-through plan is correlated to at least one individual zone strategy.

10. The apparatus of claim 9, wherein the follow-through plan is configured to modify the at least one individual zone strategy based on a time parameter.

11. An method for optimal zone strategy selection, wherein the method comprises:
  receiving, by at least a processor, user data;
  classifying, by the at least a processor, the user data to a plurality of target classes using a target classifier;
  generating, by the at least a processor, a user goal as a function of the plurality of target classes;
  generating, by the at least a processor, a plurality of zone strategies based on the user goal using a zone strategy machine learning model, wherein generating the plurality of zone strategies comprises:
    generating a zone strategy score for each zone strategy of the plurality of zone strategies using an optimization algorithm; and
    ranking the zone strategies by an objective function based on minimizing psychological stress;
  determining, by the at least a processor, follow-through data as a function of the plurality of zone strategy scores and the zone strategies;
  populating, by the at least a processor, a user interface data structure, wherein the user interface data structure comprises a visual representation of the zone strategies and the follow-through data; and
  transmitting, by the at least a processor, the user interface data structure to a display device communicatively connected to the at least a processor to display the visual representation of the zone strategies and the follow-through data using a graphical user interface (GUI).

12. The method of claim 11, wherein receiving the user data comprises utilizing a web crawler programmed to autonomously navigate and scrape user data form a plurality of virtual environments.

13. The method of claim 11, wherein the user data further comprises assessment data wherein assessment data comprises a plurality of data elements describing a plurality of physiological traits of a user.

14. The method of claim 11, wherein the user data further comprises current data and a plurality of historical user data.

15. The method of claim 11, wherein receiving the user data is as a function of an interaction between a user and a chatbot.

16. The method of claim 11, wherein the optimization algorithm comprises a regression model configured to determine optimal zone categories based on historical data.

17. The method of claim 11, wherein determining the follow-through data as a function of the plurality of zone strategy scores and the zone strategies comprises:
  receiving follow-through training data comprising a plurality of zone strategies and a plurality of zone strategy scores as input correlated to a plurality of follow-through data as output;
  training a follow-through machine learning model as a function of the follow-through training data; and
  determining the follow-through data using the trained follow-through machine learning model.

18. The method of claim 11, wherein the follow-through data further comprises improvement data containing data relating to at least an improvement of a user over a predetermined time interval.

19. The method of claim 11, wherein the follow-through data comprises at least one follow-through plan, wherein the at least one follow-through plan is correlated to at least one individual zone strategy.

20. The method of claim 19, wherein the follow-through plan is configured to modify the at least one individual zone strategy based on a time parameter.

* * * * *